(12) United States Patent
Griffin et al.

(10) Patent No.: US 7,079,648 B2
(45) Date of Patent: Jul. 18, 2006

(54) TESTER OF CRYPTOGRAPHIC SERVICE PROVIDERS

(75) Inventors: Daniel C. Griffin, Seattle, WA (US); Monica I. Ene-Pietrosanu, Redmond, WA (US); Klaus U. Schutz, Kirkland, WA (US); Glenn D. Pittaway, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 09/876,697

(22) Filed: Jun. 7, 2001

(65) Prior Publication Data

US 2004/0223607 A1 Nov. 11, 2004

(51) Int. Cl.
*H04K 1/00* (2006.01)
*G06F 9/44* (2006.01)

(52) U.S. Cl. .......................... 380/2; 717/124; 717/126

(58) Field of Classification Search .................. 380/2; 713/164, 166, 192, 194; 717/124–127, 130–134
See application file for complete search history.

(56) References Cited

U.S. PATENT DOCUMENTS 5,689,565 A * 11/1997 Spies et al. ................. 713/189
6,397,330 B1 * 5/2002 Elgamal et al. ............. 713/164

OTHER PUBLICATIONS

Aron J. D., "The Program Development Process—Part I The Individual Programmer", 1974, Addison-Wesley, pp. 170-186.*

Aron J. D., "The Program Development Process—Part II The Programming Team", 1983, Addison-Wesley, pp. 595-628.*

Beizer B., "Software Testing Techniques", 1983, Van Nostrand Reihold, pp. 154-168.*

"Conformance Test Suite Release Notes—CDSA Version 2.0, Release 3.1", 2000, Intel Corp., Retrieved from the Internet on Dec. 17, 2004: <URL: http://cvs.sourceforge.net/viewcvs.py/cdsa/cts/Attic/cts_relnotes.pdf?rev=1.6>.*

ANSI/IEEE Std 1008-1987—IEEE Standard for Software Unit Testing, 1986, IEEE, pp. 7-12.*

(Continued)

*Primary Examiner*—Gilberto Barron
*Assistant Examiner*—Minh Dinh
(74) *Attorney, Agent, or Firm*—Lee & Hayes, PLLC (57) ABSTRACT

An implementation of a technology, described herein, for ensuring reliability, stability, and adherence to a given set of security conformance standards for cryptographic program modules. An implementation of the present claimed invention is a debugging and testing tool for customized cryptographic service providers ("CSPs"). A CSP has a cryptographic type and functionality level within that type. The CSPs are tested based various test classifications. The crypto sub-system of the OS has a set of application program interface ("API") that manage cryptographic procedures called "CryptoAPI." For a CSP to be considered reliable, stable, and in compliance with a given set of security conformance standards, it must successfully operate with the CryptoAPI in a reliable and stable manner and it must react appropriately for the given security conformance standards. The CSPs are tested in order of increasing complexity/sophistication in functionality from simplest to most complex. This abstract itself is not intended to limit the scope of this patent. The scope of the present invention is pointed out in the appending claims.

20 Claims, 5 Drawing Sheets

OTHER PUBLICATIONS

Itoi, Naomaru et al., "Pluggable Authentication Modules for Windows NT," USENIX Association, 2nd USENIX Windows NT Symposium, pp. 97-107.

Offer, Brad, "Error Logging with lostreams," C/C++ Users Journal, Apr. 2000, pp. 52-58.

Rosenstein, Steven J., "Using Condition Handlers and Exit Handlers to Control Errors," Digital Systems Journal, The Magazine for VAX and AXP Professionals, Nov./Dec. 1992, pp. 33-42.

* cited by examiner

TESTER OF CRYPTOGRAPHIC SERVICE PROVIDERS

TECHNICAL FIELD

This invention generally relates to a technology for ensuring reliability, stability, and adherence to a given set of security conformance standards for cryptographic program modules.

BACKGROUND

For the modern operating system (OS), security is not just a desirable feature, but it is a vital and important component. Security sub-systems of an OS manage user authentication, which includes identification, validation, and authorization. More typically, the OS's security sub-system handles the front-end of such authorization for a network system.

Once the security sub-system has identified the user, the network validates the user and manages her access to available resources. In this typical scenario, the identified/validated users are given access only to a limited set of available resources for which the user is authorized.

Part of the core problem of most security scenarios (including the one described here) is the reliability of the OS's identification of the user. The solution to that problem varies with the needs of those employing the security systems. For example, the reliability of the user's identification is of little importance within the context of a home network. Conversely, the reliability of the user's identification is vital and extraordinarily important in a diplomatic embassy, in the Pentagon, within the R&D department of an international corporation, and the like.

Consequently, a one-size-fits-all approach to a security sub-system is undesirable. Rather, a customized approach is better.

Customizable Security Architecture

Figure 1:
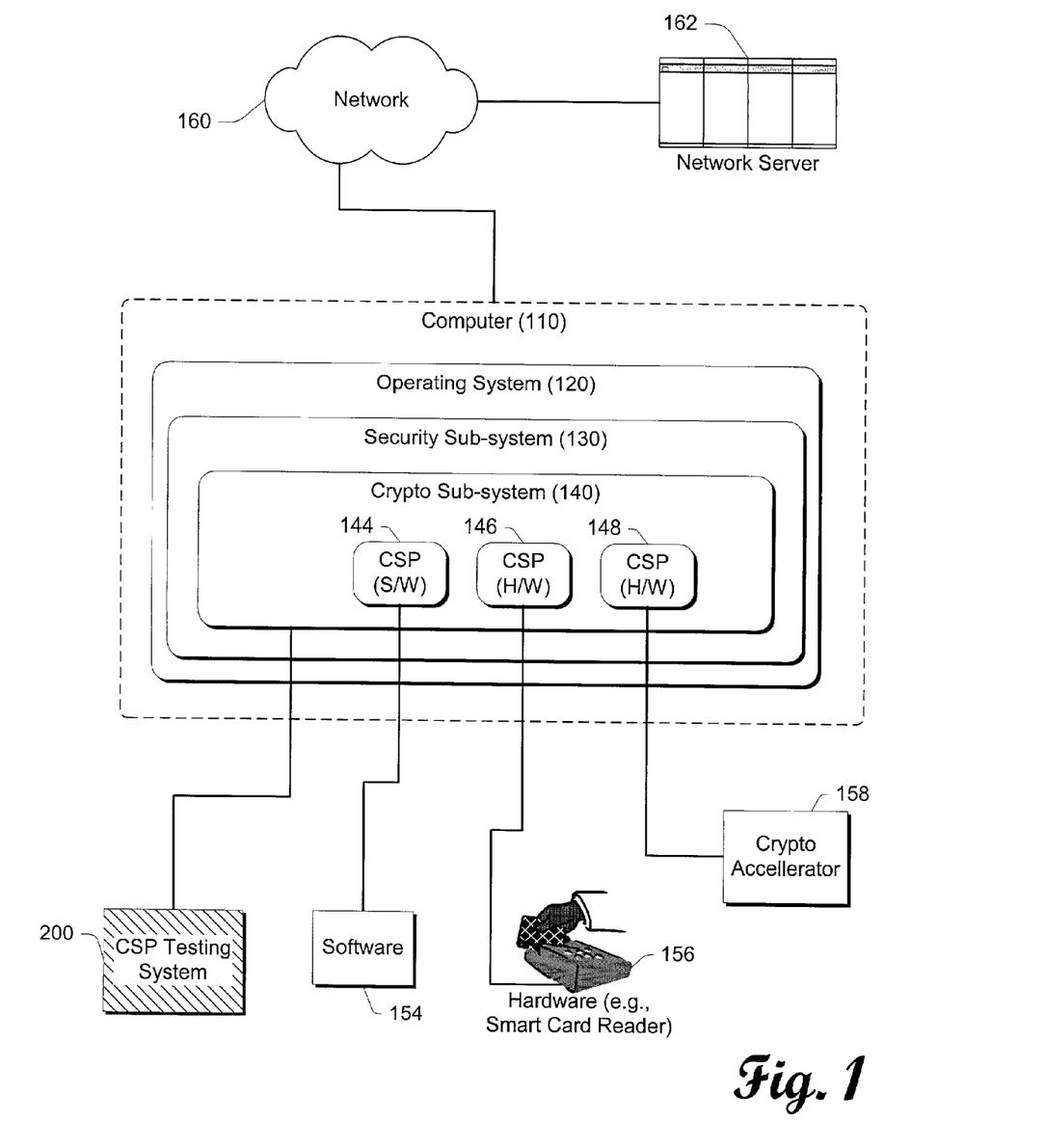
FIG. 1 is a diagram showing an example of a computing environment and a customizable security architecture. A cryptographic service provider of such an architecture may be tested by an implementation of the invention claimed herein.

FIG. 1 illustrates an example of a customizable architecture and its computing environment. FIG. 1 shows a computer 110 connected to a network server 162 via a connection through a network 160. The computer 110 includes an OS 120, such as Microsoft® Windows® 2000. That OS includes a customizable security sub-system 130.

A customizable security sub-system, such sub-system 130, typically includes a crypto sub-system 140. The crypto sub-system typically includes a set of program module front-ends that allow for the management of cryptographic information. These front-ends are typically implemented as an application program interface (API). Management includes accessing, reading, writing, creating, etc. of cryptographic information (such as the user's public-private key pairs). This cryptographic information is the basis for reliably identifying the user.

The crypto sub-system allows one or more customizable plug-ins. These plug-ins may also be called "cryptographic service providers" (CSPs), "cryptographic solutions," or "cryptographic program modules." The CSPs perform the actual cryptographic functionality, such as encryption, decryption, and key management. This cryptographic functionality is a major element in the user-identification process.

As shown in FIG. 1, the crypto sub-system includes CSPs 144–148 which are not part of the original OS. These CSPs may be customized. These custom CSPs allow for the customization of cryptographic identification of users. For custom CSP, the user may be identified by a bio-metric device (such as a retinal scanner); by a smart card reader (such as reader 156); or other the like. Other software (such as 154) or hardware (such as crypto accelerator 158) may be used.

Typically, an OS provides one or more default CSPs, such as default CSP 148 of FIG. 1. The default CSPs are provided with the original OS and they are used unless a customized CSP takes over its functionality. Also, these default CSPs may be useful as a template for the customized CSPs. The default CSP 148 gets the username and password from the user via traditional input mechanisms, such as a keyboard 158.

By allowing the introduction of customized security packages, an OS can better address the needs of a broad set of customers. This is especially desirable for cryptographic modules, since many security-oriented entities, such as governments, require the ability to provide their own, non-public, cryptographic implementations. An OS that is able to meet these needs will provide a customizable security architecture. An example of such an OS is Microsoft® Windows® 2000.

This type of architecture is also valuable where an entity (be it a person or a business, for example) needs a customized security implementation in terms of alternate user-authentication methods or alternate methods of private data storage. For example, smart cards may be used to authenticate access to systems and/or data. Another example includes using bio-metrics to authenticate a user. Examples of bio-metrics include fingerprint-recognition, retinal-recognition, iris-recognition, voice-recognition, and facial recognition. This architecture allows for the security features of an OS to be flexible as authentication technology advances.

Limitations of a Customizable Security Architecture

However, a significant drawback to such an architecture is ensuring the integrity of a customized security plug-in. If the plug-in is unreliable, unstable, and/or does not adhere to a given set of security conformance standards, then the security features of the OS may be easily compromised; thus, casting doubt on the integrity and security of the data and resources protected by the OS.

Furthermore, reports of such security compromises will harm the public perception of the overall security provided the OS despite that fact that the security breaches were caused by a customization rather than the OS itself.

Therefore, there needs to be a mechanism available so that these customized cryptographic solutions may be tested to ensure reliability, stability, and adherence to a given set of security conformance standards.

SUMMARY

Described herein is a technology for ensuring reliability, stability, and adherence to a given set of security conformance standards for cryptographic program modules.

An implementation of the present claimed invention is a debugging and testing tool for customized cryptographic service providers ("CSPs"). It tests customized cryptographic solutions to ensure reliability, stability, and adherence to a given set of security conformance standards. A CSP has a cryptographic type and functionality level within that type. The CSPs are tested based various test classifications.

The crypto sub-system of the OS has a set of application programming interfaces ("APIs") that provide access to cryptographic procedures. This may be called a "CryptoAPI." CryptoAPI typically consists of multiple functions or objects that implement cryptographic operations, for example, encryption. Applications must be able to rely on CryptoAPI to behave in a pre-defined way. For a CSP to be considered reliable, stable, and in compliance with a given set of security standards, it must successfully implement the CryptoAPI in a reliable and stable manner and it must react appropriately for the given security conformance standards.

The CSPs are tested in order of increasing complexity/sophistication in functionality from most basic/simple to most complex/sophisticated. As a result, CSPs are tested from the most basic set of APIs to a more complex set of APIs; from the most basic functionality level to the most complex functionality level made available by the CSP.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

The following description sets forth one or more specific embodiments of a tester of cryptographic service providers that incorporate elements recited in the appended claims. These embodiments are described with specificity in order to meet statutory written description, enablement, and best-mode requirements. However, the description itself is not intended to limit the scope of this patent.

The one or more specific embodiments, described herein, are exemplary implementations of the tester of cryptographic service providers. The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a tester of cryptographic service providers ("CSPs") may be referred to as an "exemplary CSP tester."

Overview

Figure 2:
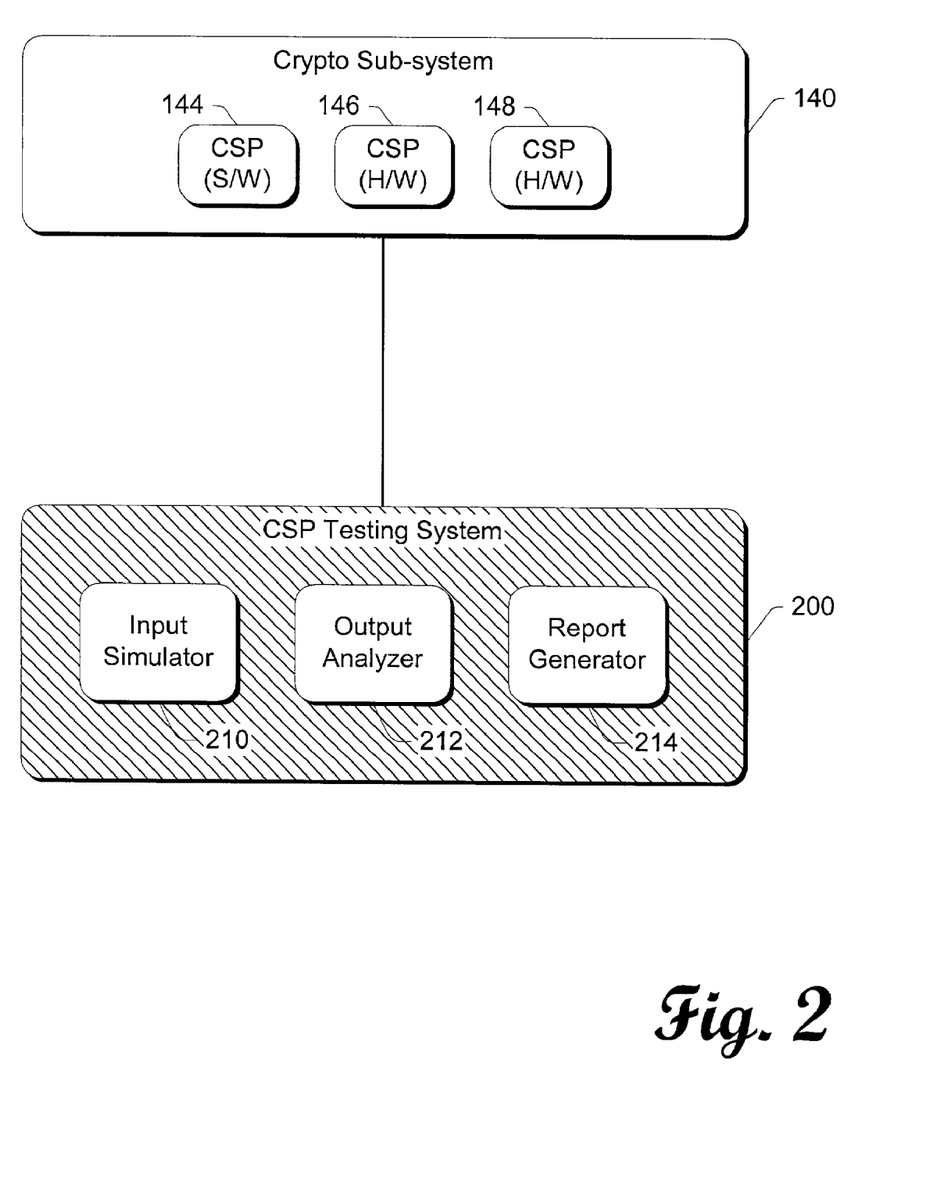
FIG. 2 is a block diagram showing part of the customizable security architecture of FIG. 1 and showing an embodiment of the invention claimed herein.
Figure 5:
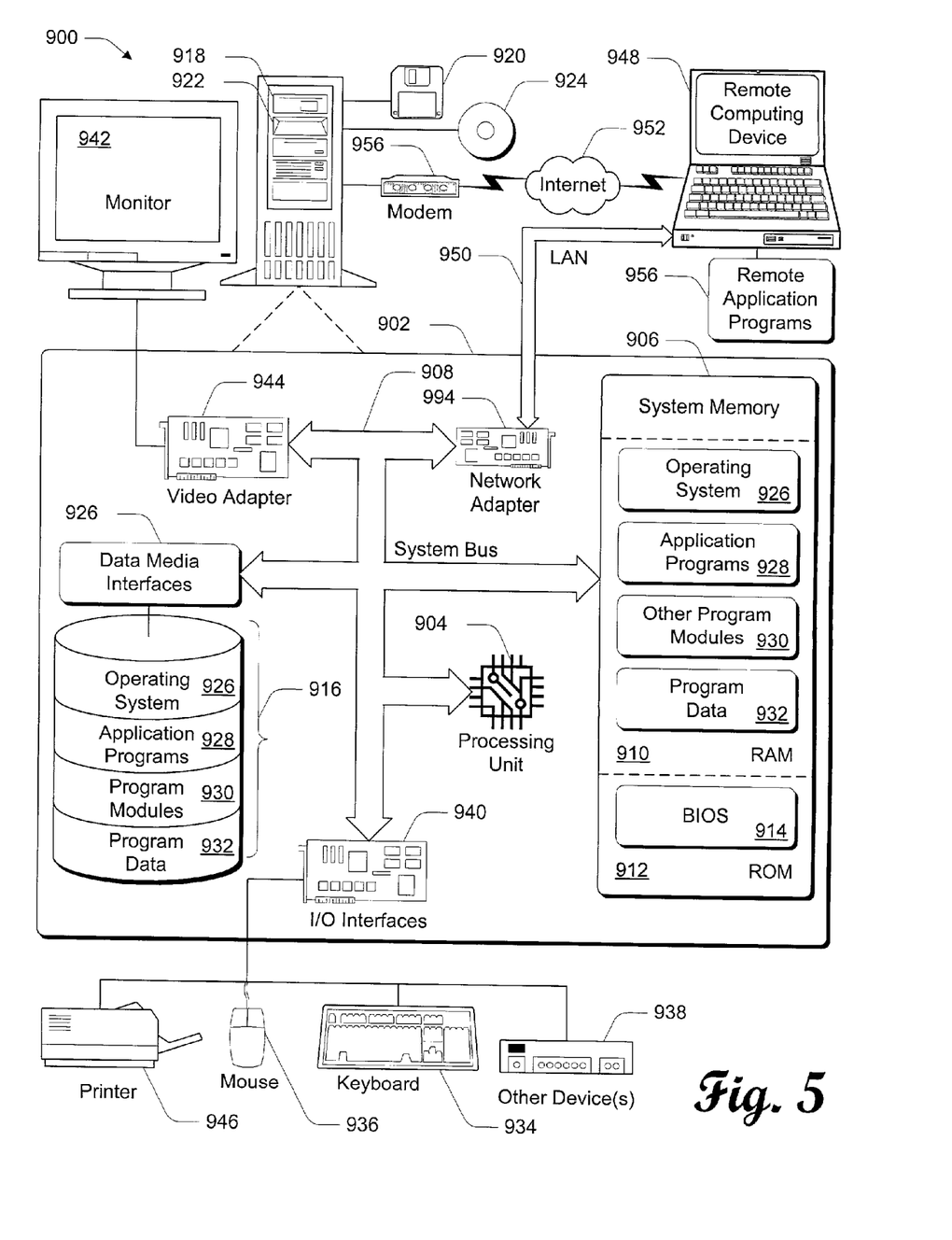
FIG. 5 is an example of a computing operating environment capable of implementing an embodiment (wholly or partially) of the invention claimed herein.

The one or more exemplary implementations, described herein, of the present claimed invention may be implemented (whole or in part) by a CSP testing system 200 and/or by a computing environment like that shown in FIGS. 1, 2, and 5.

In general, the exemplary CSP tester is a debugging and testing tool for customized cryptographic service providers ("CSPs"), which may also be called cryptographic solutions, cryptographic plug-ins, or cryptographic program modules. The exemplary CSP tester tests customized cryptographic solutions to ensure reliability, stability, and adherence to a given set of security conformance standards.

When the operating system ("OS") registers a CSP, it identifies its cryptographic type and functionality level within that type. A cryptographic type identifies which of the standard cryptographic algorithms are being used by the CSP. Examples include RSA, DSS, and ECC. A functionality level identifies how much functionality is implemented. Examples of functionality levels include signature level only and full level, although the latter may imply the presence of optional features. For more details on this, see the section below titled "CSP Classification."

The CSPs are tested based upon four classes of situations: positive, negative, scenario, and interoperability. For more details on this, see the section below titled "Testing Classifications."

The crypto sub-system of the OS has a set of application programming interfaces ("APIs") that manage cryptographic procedures. This may be called "CryptoAPI." In particular, the crypto sub-system provides a standard interface between the CSPs and client applications. For listing of an example of CryptoAPI that may be used by a crypto sub-system, see the section below titled "Other Implementation Details."

For a CSP to be considered reliable, stable, and in compliance with a given set of security conformance standards, it must successfully operate with the set of APIs in a reliable and stable manner and it must react appropriately for the given security conformance standards. The CSPs are tested in order of increasing complexity/sophistication in functionality from most basic/simple to most complex/sophisticated. As a result, CSPs are tested from the most basic APIs to the more complex APIs; from the most basic functionality level to the most complex functionality level (or at least the most complex level registered by the CSP). For more details on this, see the section below titled "Testing from Less to More Complexity."

In addition, a report is generated that indicates the performance of a CSP for each combination of the test cases performed. However, rather than directly reporting the raw results, the reporting component examines and annotates the results before reporting them. If the reporting component determines that the CSP operated consistently with the underlying OS, but that in doing so the CSP implements non-optimal behavior, than the scenario in question will be further analyzed by the reporting component to accurately determine its severity. When this occurs, the reporting component displays an informative message indicating that the CSP operated correctly but still generated incorrect results. For more details on this, see the section below titled "Filtered Reporting."

Exemplary CSP Testing System

FIG. 2 shows the crypto sub-system 140 of FIG. 1 with its CryptoAPI and CSPs 144–148. The custom CSP being tested (in this case, it will be CSP 144) is called the "subject CSP."

The CSP testing system 200 includes an input simulator 210, an output analyzer 212; and a report generator 214.

As the name implies, the input simulator 210 simulates input for the subject CSP to simulate actual input from a user. Input data and requests are submitted to the CSP via the CryptoAPI, that is, the input simulator calls a given function of the CryptoAPI with a certain set of data. The CryptoAPI then does limited processing on this input data and submits the request to the CSP. The CSP performs the requested operation on the input and reports the result back to the CryptoAPI. Finally, the CryptoAPI returns the result to the input simulator. Various forms of input are simulated including valid and invalid input.

The output analyzer 212 examines the output from the subject CSP to determine whether the CSP behaved properly. Generally, incorrect or non-existent results indicate a problem with the subject CSP. This problem can be a bug, poor programming, improper implementation of the cryptographic algorithm, etc.

The report generator 214 generates a detailed report of the test results of the subject CSP. This report details the given situation, the expected results, and the actual results. This report may be displayed on a monitor, printed on paper, saved to disk (or some other storage medium), or any combination of the above. A short exemplary report is recreated below in the section titled "Other Implementation Details."

In at least one implementation of exemplary CSP tester, the report generator 214 does more than simply report the results. It preprocess the raw results and if necessary modifies or amends them. For more details on this, see the section below titled "Filtered Reporting."

CSP Classification

All CSPs are classified based upon their cryptographic type and functionality level within that type. When a customized CSP identifies itself to the crypto sub-system (for example, via a registration process), it indicates its type and functionality level.

A cryptographic type identifies which of the standard cryptographic algorithms are being used by the CSP. These are fully defined cryptography algorithm standards.

An example of such a cryptography algorithm standard is RSA (Rivest-Shamir-Adleman), a public-key encryption technology developed by RSA Data Security, Inc. The RSA algorithm has become the de facto standard for industrial-strength encryption, especially for data sent over the Internet. The RSA algorithm is also widely used for digital signatures, the purpose of which is to authenticate both a message and its signer. It is built into many software products.

Another example of such a cryptography algorithm standard is the Digital Signature Standard (DSS) as specified by the National Institute of Standards and Technology (NIST). The DSS is a standard for digital signatures.

Other examples of cryptographic types include ECC, FORTEZZA, EXCHANGE, and SSL. Within each type, there are standard levels of functionalities. A functionality level identifies how much functionality of the given type is implemented by the custom CSP. Examples of functionality levels include base; signature level only; signature and key exchange level; full level; and Schannel. Of course, depending upon the needs of each implementation, there may be many other defined levels.

Below is a table illustrating two example types (RSA and DSS) and their associated functionality levels. In addition, illustrated in Table 1 is a breakdown of the cryptographic functions that correspond to given levels of functionality.

TABLE 1

| Cryptographic Type | Functionality Level | Crypto Capabilities | | | |
|---|---|---|---|---|---|
| | | Key Exchange | Signature | Encryption | Hashing |
| RSA | Signature | | X | | MD5; & SHA |
| | Sign. & key | X | X | | MD5; & SHA |
| | Full | X | X | RC2; & RC4 | MD5; & SHA |
| | Schannel | X | X | RC4; DES; or 3DES | MD5; & SHA |
| DSS | Signature | | X | | MD5; & SHA |
| | DH | X | X | RC2; & RC4 | MD5; & SHA |
| | Schannel | X | X | RC4; DES; or 3DES | MD5; & SHA |

These cryptographic capabilities (e.g., key-exchange, data signing, encryption, hashing, etc.) are known and understood by those of ordinary skill in the art.

For the purposes of brevity and clarity, a nomenclature is adopted herein to describe both the type and functionality level together of a CSP. In the nomenclature, the type and functionality level are separated by and an underscore ("_") and ordered. For example, RSA_SIG is a CSP that is of type "RSA" and has a minimal functionality level of "SIGnature."

Functionality Level Hierarchy

The functionality levels allow CSP's to be classified as functional aggregates. These levels define CSP requirements on a cryptographic capability basis. Generally, the functional divisions are based first on specific public-key algorithm support (signature versus key exchange) and then on specific symmetric algorithm support.

Functionality Levels:
I. Signature Only—supports signature cryptographic functions
II. Signature and Key Exchange—supports Level I+key-exchange algorithms
III. Full Provider—supports Level II+encryption (supports multiple specific encryption such as RC2 and RC4)
IV. Schannel Provider—supports Level II+encryption (supports one or more specific encryption such as RC4, DES, or 3DES)

These are internal classes for the exemplary CSP tester. External CSP types are mapped to one or more of these internal classes to facilitate the reuse of test cases. For example, a RSA_SCHANNEL CSP will be mapped to Levels I, II, and IV and it will be required to pass the test cases for those groups.

The hierarchy is intended to facilitate the association of testable behavior with specific CSP classes. For example, tests for Level I CSP's will be expected to work on all CSP's. This hierarchy allows test cases to be aggregated as building blocks for describing the functional expectations for each CSP class. For example, implementers of RSA_SCHANNEL CSP's will be expected to pass all tests in Levels I, II, and IV.

Testing Classifications

With the exemplary CSP tester, there are four test classifications: positive, negative, scenario, and interoperability. Generally, the subject CSP is tested for each test classification in that order. Of course, other implementations may have more, less, and/or different classifications.

For all of these test classifications below, the subject CSP is tested to see how well it implements the CryptoAPI, which is provided by the OS to be the interface between the subject CSP and the calling application. However, only the portion of the CryptoAPI supported by the subject CSP is tested. For more details on this, see the section below titled "Testing from Less to More Complexity."

Positive. The exemplary CSP tester tests the custom CSP for positive test cases. For this type of test case, the CyptoAPI should return a result indicating success (for example, a return value of TRUE). This is also the default test case set. The subject CSP is tested against all of the CryptoAPI, within the CSP's level of functionality, to determine whether the given API generates a success result when it is expected to do so.

Negative. The exemplary CSP tester tests the custom CSP for negative test cases. For this type of test case, the CyptoAPI should return a result indicating failure (for example, a return value of FALSE). The subject CSP is tested against all of the CryptoAPI within its level of functionality to determine whether the given API generate a failure result when it is expected to do so.

Specific Scenario. The exemplary CSP tester tests the custom CSP for specific scenario test cases. This type of test case uses multiple features of the CyptoAPI in tandem. The subject CSP is tested with API combinations of within its level of functionality to determine whether the CSP generates the correct results in response to the given API combinations.

Interoperability. The exemplary CSP tester tests the custom CSP for interoperability test cases. This type of test case uses multiple CryptoAPI features in tandem and at least two CSPs. The subject CSP is tested with combinations of APIs within its level of functionality and its results are compared with those generated by a pre-tested CSP (such as the default one). These results are used to determine whether the subject CSP is correctly interoperating with a pre-tested CSP.

Testing from Less to More Complexity

For the subject CSP to be considered reliable, stable, and in compliance with a given set of security conformance standards, it must successfully operate with the CyptoAPI in a reliable and stable manner and it must react appropriately for the given security conformance standards.

The subject CSP is tested in order of increasing complexity/sophistication in functionality from most basic/simple to most complex/sophisticated. The subject CSP is tested from the most basic features of the CryptoAPI to the most complex features (within the level of functionality of the subject CSP). The subject CSP is tested from the most basic functionality level to the most complex functionality level (within the level of functionality of the subject CSP).

Logical Hierarchical Tiers

For illustration purposes, the following are five logical hierarchical tiers for testing the subject CSP with the CryptoAPI. From one to five, the tiers increase in level of cryptographic functionality. These tiers may be mapped to the CSP levels of functionality described above in the section titled "CSP Classification."

The logical hierarchical tiers are listed on a per-API basis and represent five "access-level" categories. Access to the user's public-key pairs is considered the highest level of access, followed by the ability to create session keys. The classification levels are listed in order of increasing access level.

The five logical hierarchical tiers representing five "access-level" categories:

1. Base level—no provider handle has been acquired.
2. Miscellaneous—requires a provider handle.
3. Hash level—requires a provider handle and a hash handle.
4. Key level—requires a provider handle and a key handle. Does not require access to private keys. CyptoAPI functionality in this category should only be used in a manner that will not display UI (such as key protection or PIN dialogs) to the user.
5. Key Container level—requires a provider handle, access to private keys, and a key handle. This group can also display UI to the user.

This includes all API's in the "Key level" which can also be used with UI-protected keys.

The following outline illustrates the above tiers in terms of example CyptoAPI groups by which they are associated:
1. Base
   a. CryptAcquireContext, CRYPT_VERIFYCONTEXT
      Precludes access to private keys
      Precludes the use of CRYPT_USER_PROTECTED when generating keys.
   b. CryptGetProvParam
   c. CryptSetProvParam
   d. CryptReleaseContext
2. Misc
   a. CryptGenRandom
3. Hash
   a. CryptCreateHash
   b. CryptDestroyHash
   c. (CryptDuplicateHash—Schannel only)
   d. CryptGetHashParam
   e. CryptHashData
   f. CryptSetHashParam
4. Key (symmetric encryption)
   a. CryptDecrypt
   b. CryptDeriveKey
   c. CryptDestroyKey
   d. (CryptDuplicateKey—Schannel only)
   e. CryptEncrypt
   f. CryptGenKey
   g. CryptGetKeyParam h. CryptHashSessionKey—also requires a hash handle
i. CryptSetKeyParam
5. Key container (public/private key encryption)
   a. CryptAcquireContext, all other flags
   b. CryptDeriveKey, using any of the following flags.
      AT_KEYEXCHANGE
      AT_SIGNATURE
      CRYPT_USER_PROTECTED
   c. CryptExportKey
   d. CryptGenKey, using any of the following flags.
      AT_KEYEXCHANGE
      AT_SIGNATURE
      CRYPT_USER_PROTECTED
   e. CryptGetUserKey
   f. CryptImportKey
   g. CryptSignHash—also requires a hash handle
   h. CryptVerifySignature Mapping of Tier and Functionality Level As mentioned above, these tiers may be mapped to the CSP levels of functionality described above in the section titled "CSP Classification." The following is an example of mapping between the functionality levels and the tiers:

Signature Only. This CryptoAPI subset comprises the least level of functionality for a subject CSP that provides only signing capabilities. The purpose of this level is to provide a minimum compatibility standard for all types of CSPs.

All base-level tests.
Hash-level tests
   CryptCreateHash (CALG_SHA, CALG_MD5)
   CryptDestroyHash
   CryptGetHashParam
   CryptHashData
   CryptSetHashParam
Key-level tests
   CryptDestroyKey
   CryptGetKeyParam
   CryptSetKeyParam
Key container-level tests
   CryptAcquireContext (CRYPT_NEWKEYSET and CRYPT_DELETEKEYSET)
   CryptExportKey
   CryptGenKey (CALG_RSA SIGN)
   CryptGetUserKey
   CryptImportKey
   CryptSignHash
   CryptVerifySignature Signature and Key Exchange. (Level I (base level)+key-exchange keys) Support for key-exchange public-key pairs is required.

Key container-level tests
   CryptGenKey (CALG_RSA_KEYX)

Full Provider. (Level II+encryption (RC2 and RC4 for PROV_RSA_FULL)) This CyptoAPI subset augments the base-level requirements with commonly used hashing and encryption algorithms.

Key-level tests
   CryptDecrypt
   CryptEncrypt
   CryptGenKey (CALG_RC2 and CALG_RC4)

Schannel Provider. (Level II+encryption (at least RC4, DES, or 3DES for PROV_RSA_SCHANNEL)) The functionality in CryptoAPI subsets I and II, with the addition of the following subset, is the minimum required for an Schannel CSP.

Hash-level tests
   CryptCreateHash (CALG_SSL3_SHAMD5 and CALG_TLS1PRF)
   CryptDuplicateHash
Key-level tests
   CryptDeriveKey (CALG_SCHANNEL_ENC_KEY and CALG_SCHANNEL_MAC_KEY)
   CryptDuplicateKey
   CryptGenKey (CALG_RC4, CALG DES, or CALG_3DES; CALG_SSL3_MASTER, CALG_PCT1_MASTER, CALG_SSL2_MASTER, and CALG_TLS1_MASTER)

Optional CyptoAPI:
All Miscellaneous tests.
Hash-level tests
   CryptCreateHash, remaining algorithms
Key-level tests
   CryptDeriveKey, remaining test cases and algorithms
   CryptGenKey, remaining test cases and algorithms
   CryptHashSessionKey
Key container-level tests
   CryptDeriveKey, remaining test cases
   CryptGenKey, remaining tests cases Filtered Reporting The report generator 214 of FIG. 2 produces a formatted report of the test results. For example, the output may include:

The test specifies a cumulative "Pass" or "Fail" at the end of its output, based on the specified base error level.

The output format utilized in the test log is clear and provides a complete description of each test case. Sufficient information is provided to allow a person to "debug" the subject CSP by referring to the details of the report.

For example, each test case may have the following information associated with it.

An identifier for the CSP Class and Test Level to which the case belongs.

The name of the CryptoAPI being exercised.

A list of the values of the parameters being passed to the CryptoAPI.

Whether the test case is expected to succeed

If the test case is not expected to succeed, the error code that should have been set.

The error level to be reported if the test case fails. This may also include altering the flow of the test.

Where applicable, a list of modified parameters being passed from the CryptoAPI back to the caller.

In addition, the report generator 214 may filter the raw data before generating the output. This functionality can be performed by other components of the exemplary CSP tester.

This filtering provides a mechanism to handle known software inconsistencies and backward compatibility issues. Known inconsistencies should not be considered fatal test failures. This filtering process flags specific test case failures to be either more or less severe, depending on the version of the underlying OS.

Methodological Implementations of the Exemplary CSP Tester

Figure 3:
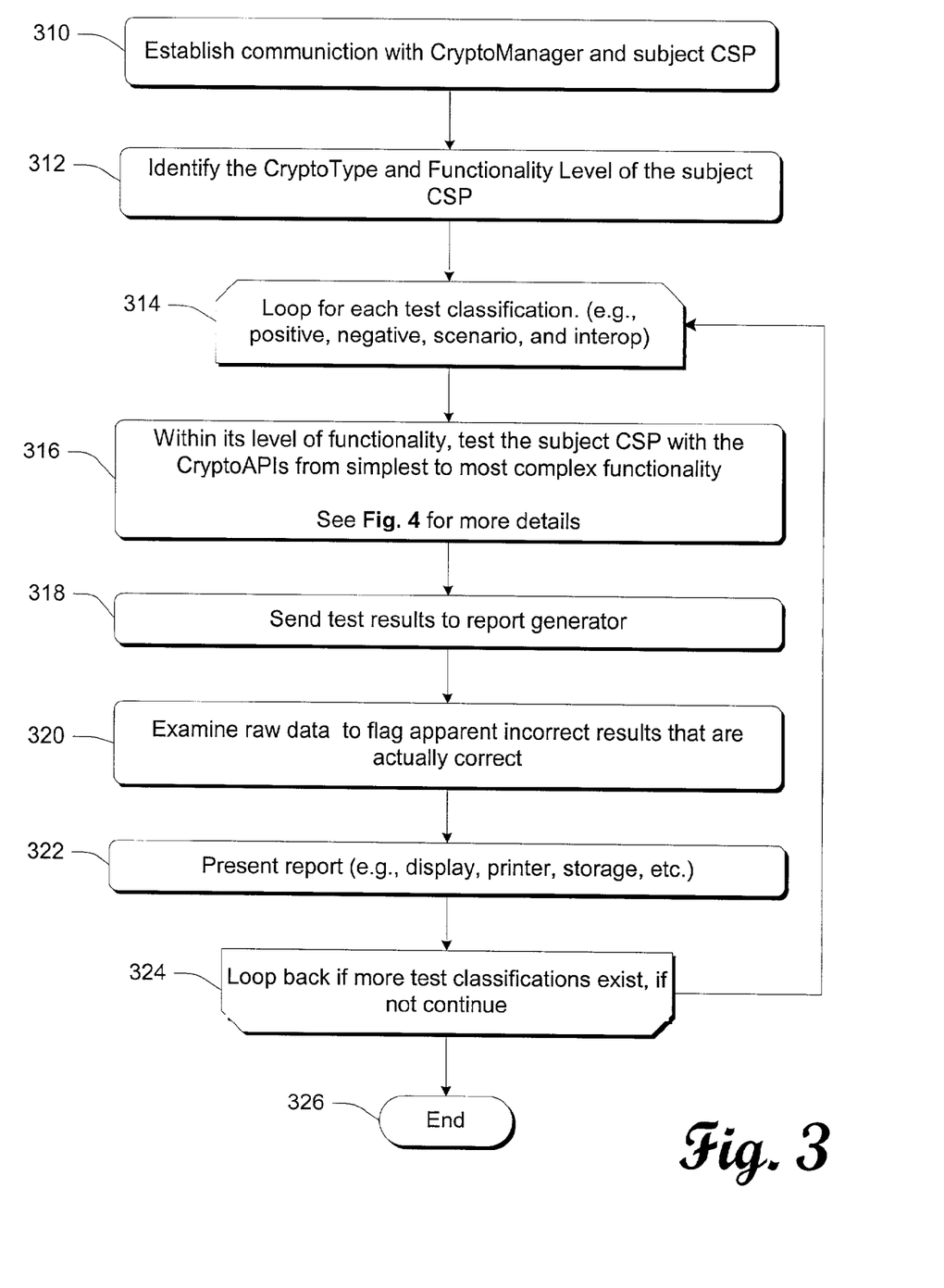
FIG. 3 is a flow diagram showing a methodological implementation of the invention claimed herein.
Figure 4:
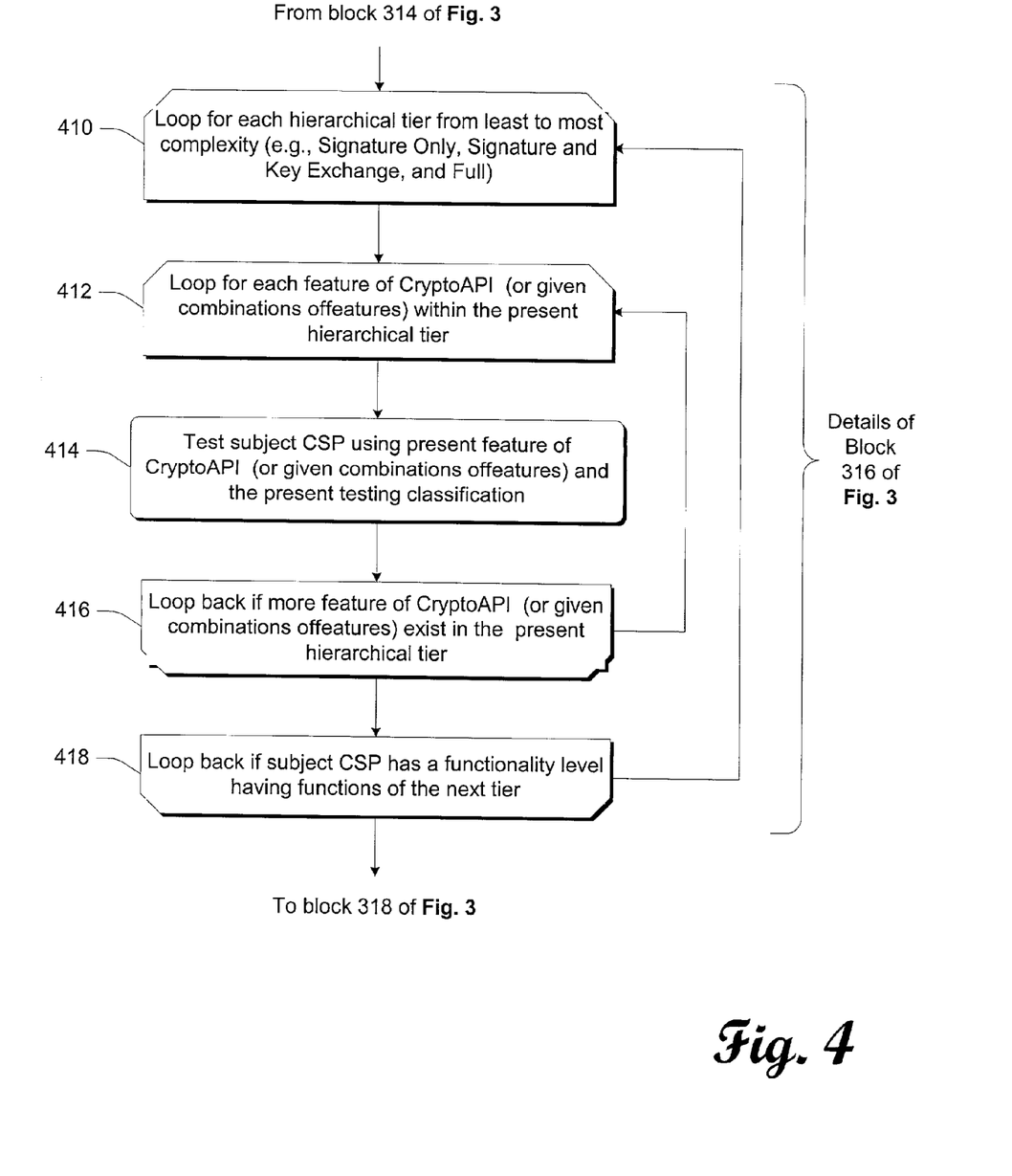
FIG. 4 is a flow diagram showing a methodological implementation of the invention claimed herein.

FIGS. 3 and 4 show methodological implementations of the exemplary CSP tester performed by the CSP testing system 200 (or some portion thereof). These methodological implementations may be performed in software, hardware, or a combination thereof.

At 310 of FIG. 3, the exemplary CSP tester establishes communication with the crypto sub-system and the subject CSP. At 312, it identifies the cryptographic type and functionality level of the subject CSP. This information will be used to direct the testing to the cryptographic type of the subject CSP and limit the testing to the functionality supported by the CSP.

Blocks 314–324, inclusive, form a loop. The loop is repeated for each test classification (e.g., positive, negative, scenario, and interop). One loop is performed for each test classification. For example, the first time through the loop the present test classification is "positive"; the next time it is "negative"; next is "scenarios"; and last is "interop."

Within the loop, at 316, the exemplary CSP tester tests the subject CSP based upon the present test classification and its identified level of functionality. The subject CSP is tested with some or all of the CryptoAPI of the crypto sub-system. More details of this block are shown in FIG. 4 and discussed below.

After testing, at 318, the test results are sent to the report generator. At 320, the report generator examines this raw data to flag apparent incorrect results that are actually correct. Thus, the report generator filters the raw data and produces a warning, or reduces the severity of the reported error, where appropriate.

At 322, the report is generated. It may be printed, displayed, stored, etc. The functions of blocks 318–322 may be performed outside of this loop, if so desired.

At 324, the loop returns back to block 314 and the next test classification is employed. If all of the test classifications have been processed, then this methodological implementation ends at 326.

In FIG. 4, blocks 410–418, inclusive, form a first loop. These blocks also represent block 316 of FIG. 3, but in more detail. This first loop is repeated for each hierarchical tier from least to most complicated (e.g., Signature Only, Signature and Key Exchange, and Full).

For example, the first time through the loop the present hierarchical tier is "Signature Only"; the next time it is "Signature and Key Exchange"; and last is "Full." This example assumes that the subject CSP has the top level of functionality. If the subject CSP is identified as having Level I (signature only), then first time through the loop the present hierarchical tier is "Signature Only" and that is the last time through.

Blocks 412–416, inclusive, form a second loop. The second loop is nested inside of the first loop. This second loop is repeated for each feature of the CryptoAPI (or given combination of features) within the present hierarchical tier. The first time through the loop the CSP may be tested with one feature of the CryptoAPI; the next time it will be tested with another feature; and so forth until all features of the CryptoAPI within a given hierarchical tier are tested. If the present test classification is "scenario" or "interop", then specific combinations of features of the CryptoAPI are tested together during each loop. If the present test classification is "interop", then specific combinations of features CryptoAPI are tested together during each loop with at least one other CSP.

At 414, the exemplary CSP tester tests the subject CSP using the present feature of the CryptoAPI (or given combinations of features) and the present testing classification (see FIG. 3 regarding loop of blocks 314–324). This may be considered a "discrete sub-testing" since one or more specific features of the CryptoAPI (which have a given level of functionality) is discretely tested with the subject CSP.

Exemplary Computing System and Environment

FIG. 5 illustrates an example of a suitable computing environment 900 within which an exemplary CSP tester, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary CSP tester may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary CSP tester may be described in the general context of computer-executable instructions, such as program modules, being executed by a computer. Generally, program modules include routines, programs, objects, components, data structures, etc. that perform particular tasks or implement particular abstract data types. The exemplary CSP tester may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 5 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interface 926. Alternatively, the hard disk drive 916, magnetic disk drive 918, and optical disk drive 922 can be connected to the system bus 908 by one or more interface (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary CSP tester may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 5 illustrates an example of a suitable operating environment 900 in which an exemplary CSP tester may be implemented. Specifically, the exemplary CSP tester(s) described herein may be implemented (wholly or in part) by any program modules 928–930 and/or operating system 926 in FIG. 5 or a portion thereof.

The operating environment is only an example of a suitable operating environment and is not intended to suggest any limitation as to the scope or use of functionality of the exemplary CSP tester(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary CSP tester may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Other Implementation Details

In this section are other implementation details.

Examples of CyptoAPI

The following are examples of CryptoAPI that may be used with implementations of the present claimed invention. These particular CryptoAPI are part of the Microsoft® Windows® 2000 operating system and more information about them may be found in the operating system's platform SDK (software developer's kit).

Example CryptoAPI:
    CryptAcquireContext
    CryptCreateHash
    CryptDecrypt
    CryptDeriveKey
    CryptDestroyHash
    CryptDestroyKey
    CryptEncrypt
    CryptExportKey
    CryptGenKey
    CryptGenRandom
    CryptGetHashParam
    CryptGetKeyParam
    CryptGetProvParam
    CryptGetUserKey
    CryptHashData
    CryptHashSessionKey
    CryptImportKey
    CryptReleaseContext
    CryptSetHashParam
    CryptSetKeyParam
    CryptSetProvParam
    CryptSignHash
    CryptVerifySignature
    CryptDuplicateHash
    CryptDuplicateKey A Short Example Report The following is a short example report of the exemplary CSP tester:

```
[ OPT]CSP under test: Company Strong Cryptographic Provider
[ OPT]CSP type: PROV_RSA_FULL
[ OPT]Test case set: Positive test cases. API's should return TRUE
[ ----]----------------------------------------
[ ERR1]Test case 2.32: ERROR_CONTINUE
[ API]CryptGetProvParam
[ INFO]Returned: False
[ INFO]Error type: The API returned bad data
[ INFO]Known error: Yes
[ INFO]Actual error code: 0x0 ( )
[ INFO]Test case description: CryptGetProvParam PP_NAME is
not Unicode
[ ----]----------------------------------------
[ ERR1]Test case 12.7: ERROR_CONTINUE
[ API]CryptSetKeyParam
[ INFO]Returned: False
[ INFO]Error type: API failed unexpectedly
[ INFO]Known error: Yes
[ INFO]Actual error code: 0x80090005 (Bad Data. )
[ INFO]Test case description: Attempt to change key to exportable
[ ----]----------------------------------------
[ ERR1]Test case 12.9: ERROR_CONTINUE
[ API]CryptSetKeyParam
[ INFO]Returned: False
[ INFO]Error type: The API returned bad data
[ INFO]Known error: Yes
[ INFO]Actual error code: 0x0 ( )
[ INFO]Test case description: CryptGetKeyParam KP_PERMISSIONS
should now include CRYPT_EXP
ORT
[ ----]----------------------------------------
[ KEY]Creating user protected key. You should see UI.
[ ----]----------------------------------------
[ KEY]Creating user protected key. You should see UI.
[ ----]----------------------------------------
[ ERR1]Test case 28.20: ERROR_CONTINUE
[ API]CryptGenKey
[ INFO]Returned: False
[ INFO]Error type: API failed unexpectedly
[ INFO]Known error: Yes
[ INFO]Actual error code: 0x80090009 (Invalid flags specified. )
[ ----]----------------------------------------
[ ERR1]Test case 28.21: ERROR_CONTINUE
[ API]CryptDestroyKey
[ INFO]Returned: False
[ INFO]Error type: API failed unexpectedly
[ INFO]Known error: Yes
[ INFO]Actual error code: 0x57 (The parameter is incorrect. )
[ ----]----------------------------------------
[ ERR1]Test case 28.28: ERROR_CONTINUE
[ API]CryptGenKey
[ INFO]Returned: False
[ INFO]Error type: API failed unexpectedly
[ INFO]Known error: Yes
[ INFO]Actual error code: 0x80090009 (Invalid flags specified. )
[ ----]----------------------------------------
[ ERR1]Test case 28.29: ERROR_CONTINUE
[ API]CryptDestroyKey
[ INFO]Returned: False
[ INFO]Error type: API failed unexpectedly
[ INFO]Known error: Yes
[ INFO]Actual error code: 0x57 (The parameter is incorrect. )
[ ----]----------------------------------------
[ ERR1]Test case 28.36: ERROR_CONTINUE
[ API]CryptGenKey
[ INFO]Returned: False
[ INFO]Error type: API failed unexpectedly
[ INFO]Known error: Yes
[ INFO]Actual error code: 0x80090009 (Invalid flags specified. )
[ ----]----------------------------------------
[ ERR1]Test case 28.37: ERROR_CONTINUE
[ API]CryptDestroyKey
[ INFO]Returned: False
[ INFO]Error type: API failed unexpectedly
[ INFO]Known error: Yes
```

-continued

```
[ INFO]Actual error code: 0x57 (The parameter is incorrect. )
----------------
There were 46 test blocks.
46 (100%) blocks attempted, 43 (93%) successful.
PASS   91% (42/46) [Attempted] [Successful]
WARN    2% ( 1/46) [Attempted] [Successful]
ERR1    6% ( 3/46) [Attempted]
```

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for testing a customized cryptographic service provider ("CSP"), the method comprising:
   determining cryptographic type of the CSP;
   determining cryptographic functionality level of the CSP;
   testing the CSP to determine whether the CSP meets its determined level of functionality for its type, wherein the CSP is tested with one or more cryptographic application program interfaces ("CryptoAPI") that have a cryptographic functionality level less than or equal to that of the CSP, wherein the testing comprises one or more discrete sub-testings of the CSP, each discrete sub-testing has a level of functionality with a level of complexity and each discrete sub-testing is associated with one or more features of CryptoAPI and with one or more other CSPs, wherein the one or more discrete sub-testings are performed generally in order of least complexity to most complexity;
   reporting whether the CSP meets its determined level of functionality based upon the results of the testing.

2. A method as recited in claim 1, wherein the testing further determines whether the CSP is stable and reliable.

3. A method as recited in claim 1, wherein the reporting further reports whether the CSP is stable and reliable.

4. A method as recited in claim 1, wherein the testing has multiple testing classifications, where a classification defines the configuration being tested with the CSP and the expected results of such testing.

5. A method as recited in claim 1 further comprising:
   examining results of the testing to determine if a CSP which is determined to meet its determined level of functionality for its type also exhibits non-optimal behavior;
   annotating the results so that information regarding non-optimal behavior of a CSP is reported by the reporting.

6. A computer comprising one or more computer storage media having computer-executable instructions that, when executed by the computer, perform a method as recited in claim 1.

7. A computer storage medium having computer-executable instructions that, when executed by a computer, performs a method as recited in claim 1.

8. A method for testing a cryptographic service provider ("CSP"), wherein the CSP has a cryptographic functionality level, the method comprising:
   testing the CSP to determine whether the CSP meets its level of functionality;
   the testing comprising one or more discrete sub-testings of the CSP, each discrete sub-testing has a level of functionality with a level of complexity and each discrete sub-testing is associated with one or more features of a CryptoAPI and with one or more other CSPs, wherein the one or more discrete sub-testings are performed generally in order of least complexity to most complexity;
   examining results of the testing to determine if the CSP which is determined to meet its determined level of functionality also exhibits non-optimal behavior;
   reporting whether the CSP meets its determined level of functionality based upon results of the testing, the reported results comprising annotated information regarding non-optimal behavior when the examining determines the CSP to exhibit non-optimal behavior.

9. A method as recited in claim 8, wherein the testing further determines whether the CSP is stable and reliable.

10. A method as recited in claim 8 further comprising determining cryptographic type of the CSP.

11. A method as recited in claim 8 further comprising determining level of functionality of the CSP.

12. A method as recited in claim 8, wherein during the testing, the CSP is tested with one or more cryptographic application program interfaces ("CryptoAPI") that have a cryptographic functionality level less than or equal to that of the CSP.

13. A method as recited in claim 8, wherein the testing has multiple testing classifications, where a classification defines the configuration being tested with the CSP and the expected results of such testing.

14. A method as recited in claim 8, wherein the testing has multiple testing classifications, where a classification defines the configuration being tested with the CSP and the expected results of such testing; the multiple testing classifications consists of a group including positive, negative, specific scenarios, and interoperability.

15. computer storage medium having computer-executable instructions that, when executed by a computer, performs a method as recited in claim 8.

16. A computer comprising one or more computer storage media having computer-executable instructions that, when executed by the computer, perform a method comprising:
   testing a program module having a functionality level to determine whether the program module meets its level of functionality, wherein the program module is a cryptographic service provider ("CSP");
   the testing comprising one or more discrete sub-testings of the program module, each discrete sub-testing has a level of functionality with a level of complexity and each discrete sub-testing is associated with one or more features of a CryptoAPI and with one or more cryptographic service providers (CSPs), wherein the one or more discrete sub-testings are performed generally in order of least complexity to most complexity;
   examining results of the testing to determine if the program module which is determined to meet its determined level of functionality also exhibits non-optimal behavior;
   reporting whether the program module meets its determined level of functionality based upon results of the testing, the reported results comprising annotated information regarding non-optimal behavior when the examining determines the program module to exhibit non-optimal behavior.

17. A computer as recited in claim 16, wherein the testing further determines whether the program module is stable and reliable.

18. A method computer as recited in claim 16, wherein during the testing, the program module is tested with one or more application program interfaces ("API") that have a functionality level less than or equal to that of the program module.

19. A computer as recited in claim 16, wherein the testing has multiple testing classifications, where a classification defines the configuration being tested with the program module and the expected results of such testing.

20. A computer as recited in claim 16, wherein the testing has multiple testing classifications, where a classification defines the configuration being tested with the program module and the expected results of such testing; the multiple testing classifications consists of a group including positive, negative, specific scenarios, and interoperability.

* * * * *